UNITED STATES PATENT OFFICE.

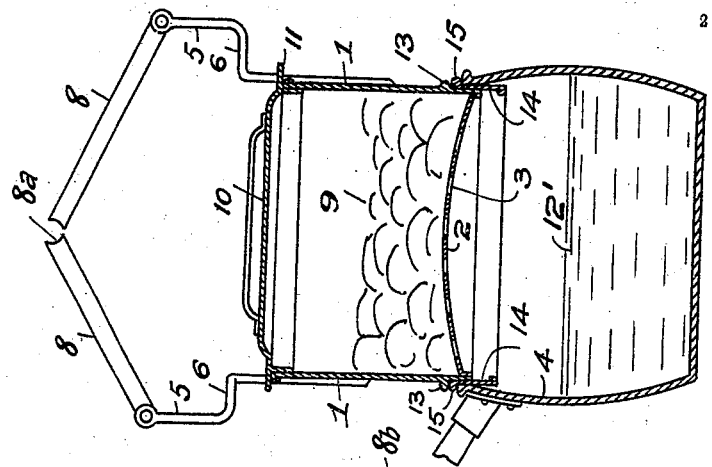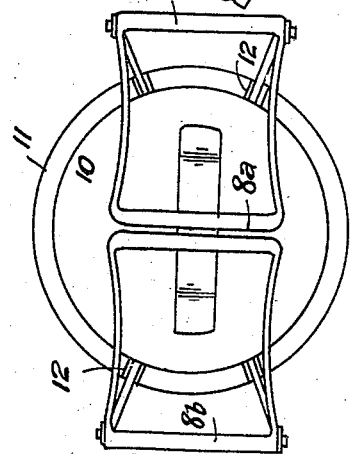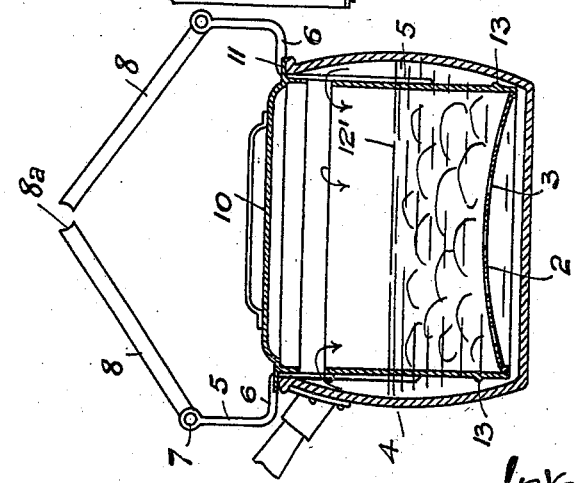

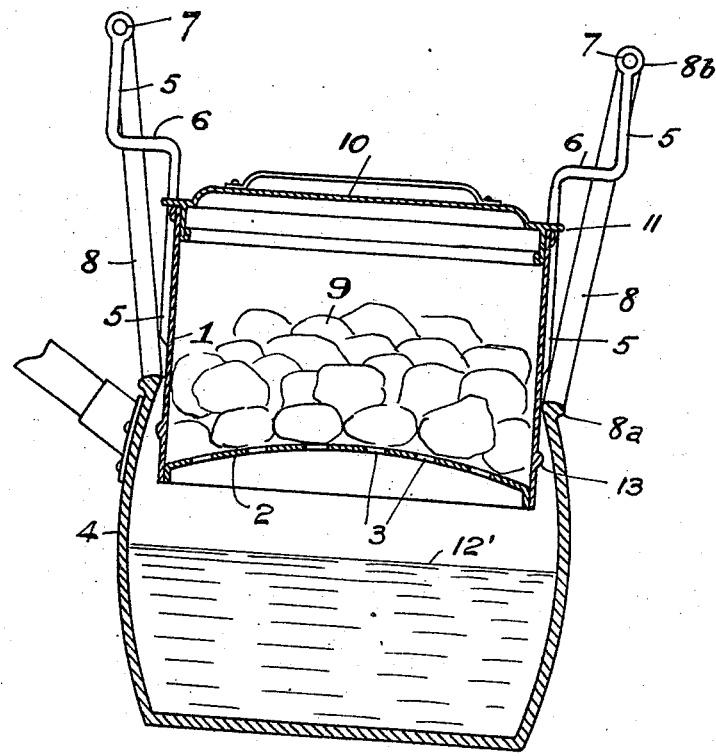

JOHN THORNE, OF BOOTLE, ENGLAND.

COOKING UTENSIL.

987,510.  Specification of Letters Patent. Patented Mar. 21, 1911.

Application filed May 28, 1910. Serial No. 563,998.

*To all whom it may concern:*

Be it known that I, JOHN THORNE, a subject of the King of Great Britain, and a resident of Bootle, England, have invented certain new and useful Improvements in Cooking Utensils, of which the following is a specification.

This invention relates to improvements in cooking utensils of that type in which the material to be cooked is contained in a perforated cage or strainer adapted to be supported within a saucepan or the like cooking vessel, and to be lifted clear of the water and held in such raised position for the purpose of steaming or draining the contents.

The invention is more particularly directed to that type of apparatus in which perforated strainers for use in cooking utensils have been supported in the draining position by means of reversible handles engaging the rim of the utensil or in which similar containers have been supported in the steaming position by means of a detachable ring fitting between the mouth of the utensil and the exterior of the container.

The invention is illustrated in the accompanying drawings, in which,

Figure 1 is a medial vertical section of the container in place in the saucepan for boiling purposes. Fig. 2 is a plan of Fig. 1. Fig. 3 shows the position of the container on the supporting ring when using the apparatus for steaming. Fig. 4 shows the handles in the reversed position to support the container for straining the cooked material.

The container consists of a cylindrical receptacle 1 the bottom 2 of which is arched and perforated at 3 as shown. This container is an easy fit in the mouth of the saucepan 4 and is provided with brackets 5 shouldered at 6 so that it may be suspended in the saucepan upon these shoulders which rest on the upper rim of the pan, as shown in Fig. 1. In the tops 7 of the brackets are pivoted a pair of substantially rectangular handle members by which the container may be lifted into and out of the saucepan. These handle members comprise the pivot-bar, $8^b$, and the handle bars $8^a$, which are united by the connection bars 8, which are made fairly long as shown. The handle members are concaved at the extremity of their free ends, $8^a$, as indicated in the drawings, for the purpose hereinafter described.

In the position illustrated in Fig. 1 the material 9 in the container is immersed in the water for the ordinary operation of cooking by boiling, the lid 10 resting on the upper edge of the saucepan, its rim 11 being notched away at 12 to clear the shoulders 6 and allow the lid to rest more or less steam tightly on the pan.

In order to permit of the material being easily and cleanly strained after cooking, the handle members are reversed until they assume the position shown in Fig. 4, the concaved shape of the handle ends $8^a$ enabling them to be seated securely on the pan rim. When the container is supported in this position the material is held clear of the water $12^1$ and may be effectually strained, the axis portion $8^b$ of the handles still forming an effectual handle for use in lifting the container with the material out of the pan.

The container 1 is provided with an annular ridge 13, which is made of such a size that it will easily pass through the mouth of the pan, but when it is desired to use the apparatus as a steam cooker, the supporting ring 14 is inserted into the mouth of the pan as in Fig. 3, an upper ridge 15 on this ring just projecting sufficiently to rest on the pan rim and form a practically steam tight joint therewith. When the container is inserted into the supporting ring 14 the annular ridge 13 on the container rests on the edge 15 of the ring thus forming a steam tight joint between the container and the pan. When the lid is now placed in position on the container the whole apparatus becomes a steam cooker, the material 9 being held out of contact with the water $12^1$, the steam from which permeates the interior of the container by way of the perforations 3 in the base.

When using the apparatus for boiling as in Fig. 1, the lid 10 may be slightly raised clear of the shoulders 6 and then given a partial rotation so that the notches do not coincide with the shoulders, the rim 11 resting on the top of the shoulders. This position admits of free boiling without any liability of soot falling into the pan, as is apt to occur when the lid is tilted slightly clear of the pan with an ordinary type of pan and lid.

By making the upper edge of the container 1 so that it shall be considerably below the top rim of the pan when in the boiling position shown in Fig. 1, the water which rises in the annulus between the container and the pan does not boil over out of the pan but returns into the interior of the retainer as shown by the arrows, thus setting up a good circulation.

The apparatus with slight modifications of detail would be applicable for use with pans other than that of the type illustrated.

I claim:

In a cooking utensil, a pan, a perforated container in the pan, brackets secured on said container, said brackets comprising shoulders adapted to rest on said pan, handle members pivoted to the brackets through the medium of pivot bars, handle bars parallel with said pivot bars, connection bars uniting the handle and the pivot bars, said handle members having concaved portions adapted to be seated upon the rim of the pan for the purpose specified.

In testimony whereof I affix my signature in presence of two witnesses.

JOHN THORNE.

Witnesses:
A. J. DAVIES,
F. NAYLOR.

Copies of this patent may be obtained for five cents each, by addressing the "Commissioner of Patents, Washington, D. C."